(12) United States Patent
Karl

(10) Patent No.: US 6,810,576 B2
(45) Date of Patent: Nov. 2, 2004

(54) METHOD FOR PRODUCING A SHAFT AND A DEVICE CONTAINING A SHAFT OF THIS TYPE

(75) Inventor: Martin Karl, Sasbachwalden (DE)

(73) Assignee: Robert Bosch GmbH, Stuttgart (DE)

( * ) Notice: Subject to any disclaimer, the term of this patent is extended or adjusted under 35 U.S.C. 154(b) by 189 days.

(21) Appl. No.: 10/069,450
(22) PCT Filed: Feb. 9, 2001
(86) PCT No.: PCT/DE01/00497
§ 371 (c)(1),
(2), (4) Date: Jun. 3, 2002
(87) PCT Pub. No.: WO01/65668
PCT Pub. Date: Sep. 7, 2001

(65) Prior Publication Data
US 2003/0000069 A1 Jan. 2, 2003

(30) Foreign Application Priority Data
Feb. 28, 2000 (DE) .......................... 100 09 053
Jun. 21, 2000 (DE) .......................... 100 30 353

(51) Int. Cl.⁷ .................. H02K 15/00; H02K 15/14; H02K 15/16
(52) U.S. Cl. .................. 29/596; 29/597; 29/598; 29/732; 29/898.07; 29/90.01; 384/539; 384/903; 310/90; 310/42
(58) Field of Search .................. 29/596, 597, 598, 29/732, 898.07, 90.01; 384/539, 903; 310/90, 42

(56) References Cited

U.S. PATENT DOCUMENTS

| | | | |
|---|---|---|---|
| 2,133,091 A | | 10/1938 | Clark |
| 5,089,736 A | * | 2/1992 | Oyafuso ............ 310/90 |
| 5,794,326 A | | 8/1998 | Kikly |
| 5,829,911 A | | 11/1998 | Nakai |
| 5,971,621 A | * | 10/1999 | Oyafuso et al. ........ 384/539 |
| 6,050,728 A | * | 4/2000 | Obara et al. ........ 384/613 |

FOREIGN PATENT DOCUMENTS

| | | |
|---|---|---|
| DE | 39 00 186 A | 7/1990 |
| DE | 297 02 525 U1 | 7/1998 |

* cited by examiner

*Primary Examiner*—Carl J. Arbes
*Assistant Examiner*—Tim Phan
(74) *Attorney, Agent, or Firm*—Michael J. Striker

(57) ABSTRACT

The invention relates to a method for producing a shaft (22), and an apparatus containing such a shaft (22), in particular an armature shaft (22) of an electric motor-driven drive (12) that is brought to a nominal dimension (44). The shaft (22) is reshaped by means of material displacement (46) at least one point until the nominal dimension (44) is reached.

7 Claims, 2 Drawing Sheets

METHOD FOR PRODUCING A SHAFT AND A DEVICE CONTAINING A SHAFT OF THIS TYPE

CROSS REFERENCE TO RELATED DOCUMENTS

This application is a 371 of PCT/DE01/00497, filed Feb. 9, 2001, which claims the benefit of German Patent Applications: No. 100 09 053.2, filed Feb. 28, 2000 and No. 100 30 353.6, filed Jun. 21. 2000.

BACKGROUND OF THE INVENTION

The invention relates to a method for producing a shaft, and an apparatus containing such a shaft.

An apparatus was made known in the German utility-model patent GM 297 02 525.2 that is used, for example, to move window panes, sunroofs, or seats. In order to prevent an undesired axial end play of the armature shaft, it is proposed there that a damper rubber be pressed into a recess of the housing on at least one of its faces. The armature shaft presses a stop disk against this damping rubber. By means of the firmly locking into position and the elastic properties of the damping rubber, the armature shaft remains firmly fixed in place despite ageing processes and signs of wear. Additionally, the armature shaft can be installed very easily and cost-effectively together with the damping rubber. However, the elimination of the axial end play of the armature by means of such a damping rubber limits the maximally permissible tolerance in the production of the armature shaft. Narrower tolerances lead to higher production costs, however, which are undesired in a mass production of the armature shaft.

SUMMARY OF THE INVENTION

The method according to the invention has the advantage that the favorable offset of end play with the damping rubber can continue to be used even when the shaft is fabricated not very exact to length in production. By introducing an additional working step, the manufacturing-related length of the shaft subject to tolerance can be decoupled from the elimination of the end play of the shaft. This also makes a very cost-effective and simple manufacture of the endless screw on the armature shaft possible. The end play is suppressed even more reliably as compared with earlier means for attaining the object of the invention, because the tolerance stack-ups are markedly lower after the material displacement than before. The useful We of the armature shaft is increased as a result and clicking noises produced when the direction of rotation changes are reliably prevented.

If the material displacement takes place near an end of the shaft, the stability of the shaft across the entire length is largely maintained. Additionally, the material displacement at this point does not take up any additional space. If the material displacement is carried out by means of burnishing, this is a cost-effective, exact and easy-to-use process. Burnishing brings about a continuous elongation of the shaft that can be well-controlled. The burnishing results in an even constriction, which also has a very advantageous effect on the stability of the shaft. It is also possible to achieve the material displacement simply by means of squeezing, however. Such a working step is less expensive than burnishing, but it does not entirely achieve the same dimensional accuracy.

If the length of the shaft is measured during the material displacement, the nominal dimension of the shaft can be achieved rapidly and exactly in one working cycle.

It proves to be particularly favorable when the shaft is installed in the pole well of the electric motor before the material displacement is started. The tolerances that are stacking up are eliminated as a result. Moreover, the armature shaft then lies in "its" bearings, so that the dimensional accuracy and the position of the material displacement can be coordinated with the eventual site of application, particularly when burnishing the material displacement.

It is advantageous to measure the length of the part of the installed shaft extending over the pole well, because the shaft can then be produced to the nominal dimension in the installed state. As a result, the tolerance stack-up of the end play can be markedly reduced.

A further alternative is to measure the set value for the end play during material displacement with the shaft in the installed state. This has the advantage that the measured value of greatest interest—the end play—can be measured directly and it can be adjusted exactly to the set value by means of the material displacement. With this method, all manufacturing and fitting tolerances are completely eliminated.

Efficient process engineering is a further advantage of material displacement by means of burnishing. The endless screw of the armature shaft can be produced and the material displacement can be carried out using just one tool. Even if one tool each is used for the burnishing of the endless screw and the burnishing of the material displacement, one complete working step is spared, because the shaft need be chucked only once for this process. This makes rapid and cost-effective production possible.

The apparatus according to the invention having the features of the independent claim 9 has the advantage that a high-quality product with narrow tolerances is created despite initially great production tolerances of the shaft after installation.

The material displacement located at the end of the shaft and the semicircular cross-sectional area of the circumferential groove have an advantageous effect on the preservation of stability of the shaft. It is advantageous that the shaft diameter can be reduced up to one-half of the original value.

BRIEF DESCRIPTION OF THE DRAWINGS

An exemplary embodiment of an apparatus according to the invention is presented in the diagram, and it is explained in greater detail in the subsequent description.

DETAILED DESCRIPTION OF THE PREFERRED EMBODIMENTS

Figure 1:
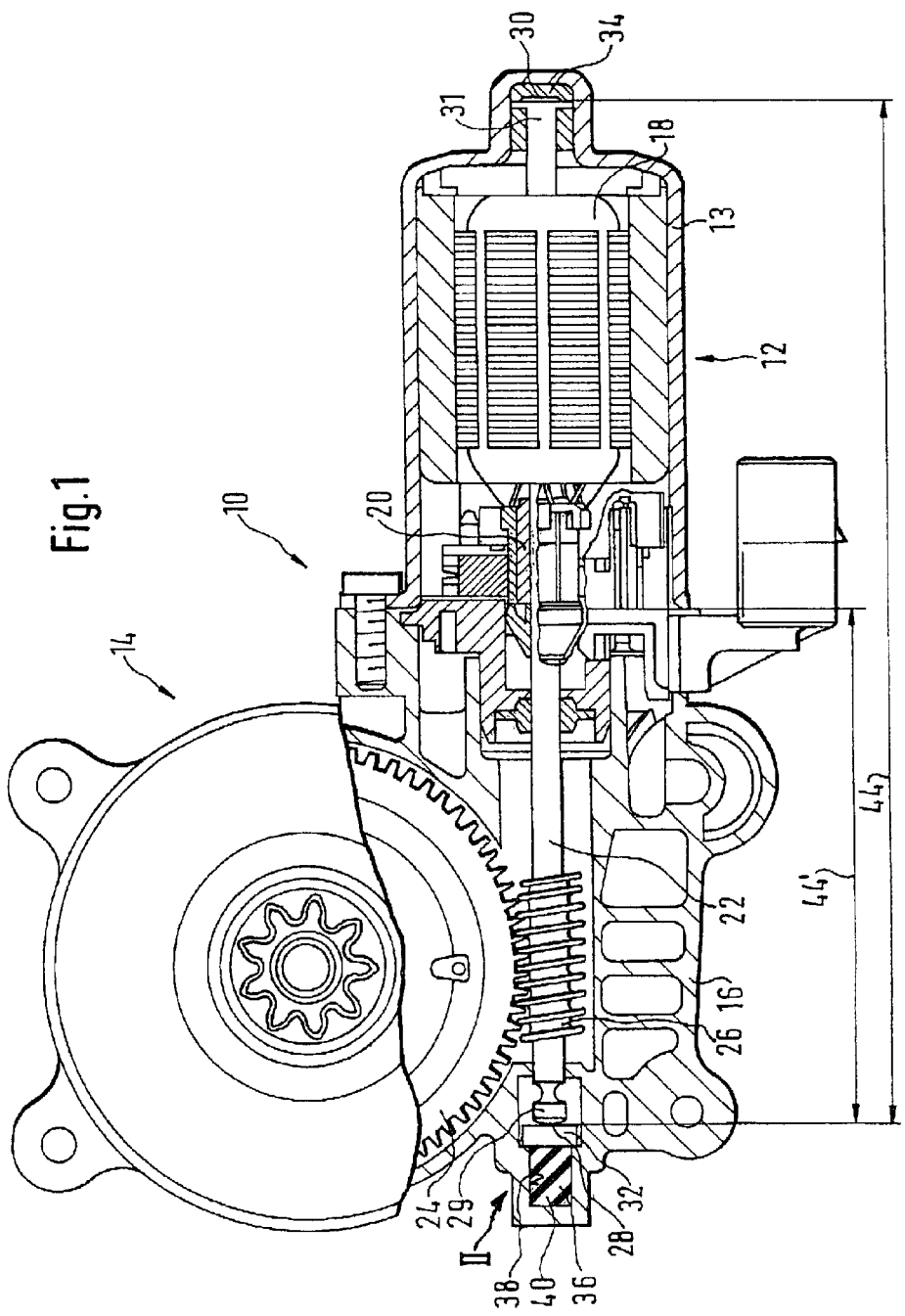
FIG. 1 shows a sectional drawing of an apparatus.

An adjusting drive 10 is shown in FIG. 1 that comprises a motor 12 and a multisectional housing 16 enclosing a gear 14. The motor 12 is electrically commutated and comprises an armature 18, a commutator 20, and an armature shaft 22 supported in bearings in multiple locations that extends into the region of the gear 14. An endless screw 26 that communicates with a worm gear 24 is rolled onto the armature shaft 22. This is supported at the faces 28 and 30 of the armature shaft 22 via stop disks 32 and 34 and at the housing 16 or a part of the housing 16 via a damping means 36.

The housing 16 comprises a recess 38 in the region of the face 28 of the armature shaft 22, into which a damping rubber 40 is pressed as damping means 36. The damping rubber 40 comprises a firmly specified elastic region 42. The conception according to the invention therefore consists of the fact that the tolerances of the armature shaft 22 and the housing parts 16, together with the assembly tolerances, may not exceed the dimension of the elastic region 42 (refer to FIG. 2), in order to effectively prevent play in the armature shaft. Instead of the damping rubber 40, other damping means 36 such as spring elements or rigid stops are feasible as well.

In order to adhere to such a narrow tolerance, according to the invention, the shaft 22 is brought to a nominal dimension 44 by means of material displacement 46 after the endless screw 26 is rolled on. The tolerance of this nominal dimension 44 is markedly smaller than the elastic region 42 of the damping rubber 40. The material displacement 46 is realized by constricting the shaft 22, by way of which the shaft 22 increases. The material displacement 46 is applied to one end region 29 between the endless screw 26 and the face 28 in a region where the shaft 22 is not radially supported in bearings.

Methods of material displacement 46 are also feasible in which the shaft 22 is swaged, which would result in a shortening of the shaft 22. Theoretically, there are a plurality of points on the shaft 22 where a material displacement would not disturb the structure. In order to maintain the overall stability of the shaft 22, however, it presents itself to displace material on the ends 29, 31 of the shaft 22 in the region toward their faces 28, 30.

A simple method for material displacement 46 is given by the burnishing of the shaft 22 on its end 29. This method is to be preferred over others because a burnishing device 54 must be held in front anyway in order to produce the endless screw 26 on the armature shaft 22. The burnishing for material displacement 46 can thereby be carried out in one working step, i.e., simultaneously with the burnishing of the endless screw 26, or one directly after the other during one chucking on the burnishing machine 54.

The length of the shaft 22 is measured simultaneously during the material displacement 46. The shaft 22 is deformed until the length measurement of the armature shaft 22 shows the nominal dimension 44. The nominal dimension 44 is thereby based on the entire length of the armature shaft 22 between its two faces 28, 30.

In a second exemplary embodiment, the armature shaft 22 is installed in a part of the housing 16—in a pole well housing 13 in this case—before its length is changed. The part of the armature shaft 22 extending over the pole well 13 is thereby measured simultaneously during its material displacement 46. In this case, the nominal dimension 44' (FIG. 1) is only based on the part of the armature shaft 22 extending out over the pole well 13. The tolerances of the field frame 13 can thereby be eliminated as well.

In a further exemplary embodiment, the length of the armature 22 is not measured as a nominal dimension 44, but rather, the axial end play 44" (indicated in FIG. 2 with a dotted line) of the shaft 22 is measured directly in its installed state. After the armature shaft 22 is completely installed and the housing 16 is fully assembled, the material displacement 46 of the armature shaft 22 is thereby carried out via one or more openings in the housing 16. The armature axial end play 44" is measured by means of an electric voltage or the current drawn by the electric motor that is applied to the electric motor 12. If the end play is great, the motor 12 reaches its final speed already at relatively low amperage. If the length of the armature shaft 22 is now extended during the current measurement in this case, the armature shaft 22 presses axially against the damping rubber 40 at any time. As soon as the shaft 22 touches the damping rubber 40, a certain braking torque is produced that can be measured via an increase in current or a decrease in speed of the motor 12. If the current and/or the speed reach certain values, this is an indication that the end play has been eliminated or stopped in predetermined fashion.

Figure 2:
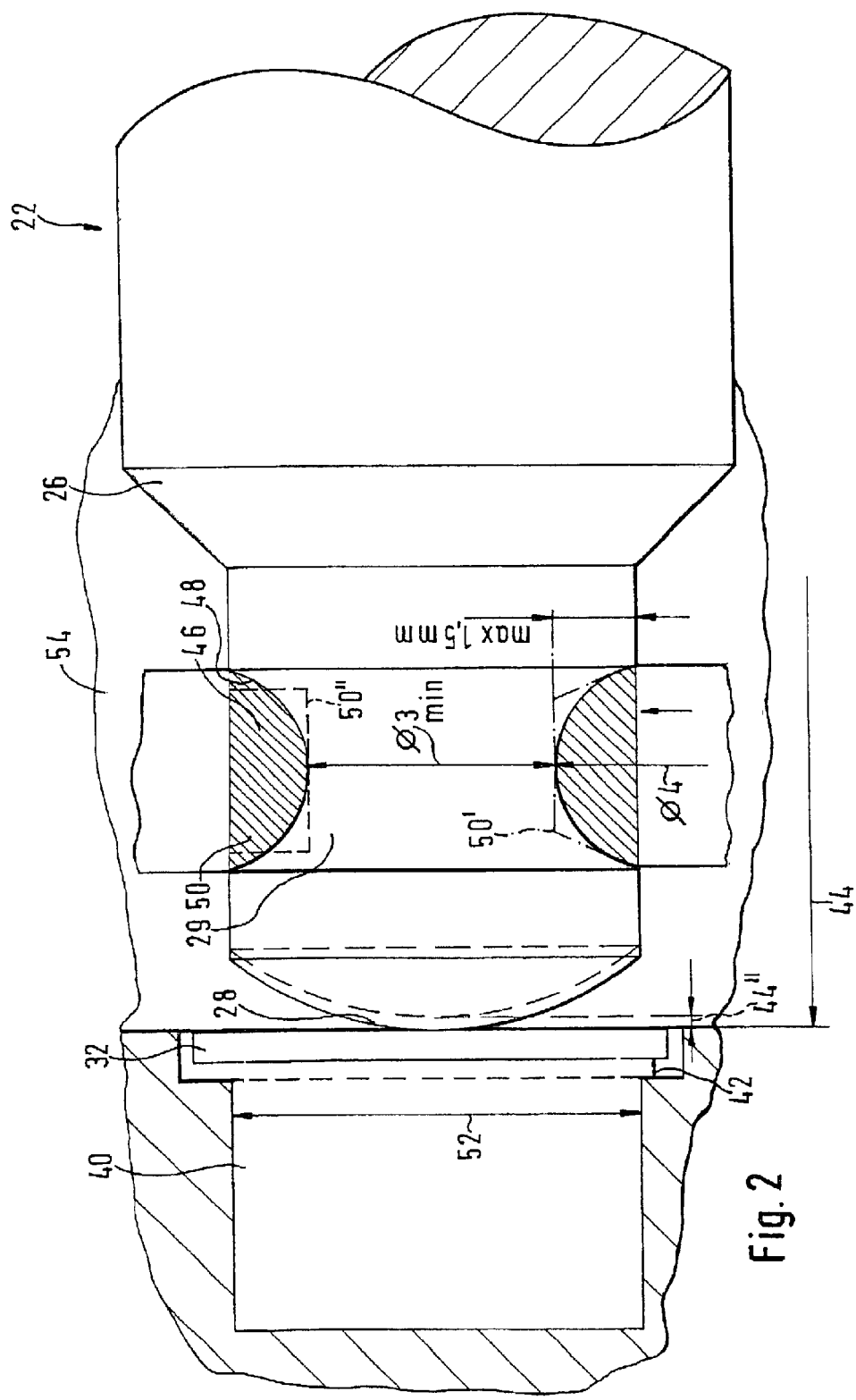
FIG. 2 shows an enlarged section of the shaft according to II in FIG. 1.

FIG. 2 shows the material displacement 46 on the end 29 of the armature shaft 22 in detail. The material displacement 46 is shaped in the form of a ring groove, i.e., encircling the entire shaft. Such a groove 48 is easy to produce by means of burnishing. The cross-sectional area 50 of the groove 48 is semicircular, i.e., the more the shaft 22 must be elongated, the deeper a segment of a circle is pressed into the shaft. It must be ensured that the cross-section 50 of the shaft 22 is not reduced to too great of an extent at the point of material displacement 46. A reduction of the shaft diameter 52 to 50% of the original value is regarded as the limit value.

In further exemplary embodiments, the cross-sectional area 50 of the ring-shaped groove 48 has a form other than a semicircular form. This is the case, for example, when the burnishing tool 54 is not shaped radially, but rather takes on another, random shape. Possible shapes of the cross-sectional area 50 are a trapezoid 50' or a rectangle 50" (dotted lines in FIG. 2). With such a profile, more material is displaced along one side of the trapezoid or rectangle from the beginning onward during burnishing, while little material is displaced at the beginning with a semicircular profile of the groove 48.

It is also feasible that the groove 48 is not ring-shaped around the entire circumference of the shaft 22, but rather comprises one or more notches distributed around the circumference, for example. Such a method creates difficulties, however, with regard for a precise nominal dimension 44 of the shaft 44, or it can produce unbalanced states. The selection of the exact point of material displacement 46 is variable between the face 28 and the start of the endless screw 26 on the motor shaft 22.

What is claimed is:

1. A method for producing an armature shaft (22) of an electric motor-driven drive (10) in order to prevent an undesired axial end play having a nominal dimension (44), the method comprising the following steps:

reshaping the shaft (22) at least one point by means of material displacement (46) until reaching the nominal dimension (44), wherein the material displacement includes constricting the shaft (22) in order to prevent an undesired axial end play, whereby a length of the shaft (22) is increased.

2. The method according to claim 1, wherein the material is displaced by burnishing the shaft (22).

3. The method according to claim 1, further comprising the steps of measuring a length of the shaft (22) during material displacement (46) and terminating the material displacement (46) upon reaching the specified nominal dimension (44).

4. The method according to one claim 1, further comprising the step of installing the shaft (22) in a pole well (13) of an electric motor (12) prior to performing the material displacement (46).

5. The method according to claim 1, further comprising the steps of measuring a length of a part of the shaft (22) extending over the pole well (13) and comparing the length with the nominal dimension (44).

6. The method according to claim 1, further comprising the steps of measuring an end play of the shaft (22) during material displacement (46) and terminating the material displacement (46) upon reaching an end play set value.

7. The method according to claim 1, further comprising the steps of rolling an endless screw (26) on the shaft (22) on one section and performing the material displacement (46) up to the nominal dimension (44) simultaneously or afterward at least section-by-section on a same machine tool.

* * * * *